United States Patent [19]

Wiegleb et al.

[11] Patent Number: 4,938,256

[45] Date of Patent: Jul. 3, 1990

[54] APPARATUS FOR THE PRODUCTION OF PARTICULAR CONCENTRATIONS OF GASEOUS MATERIALS AS WELL AS FOR MIXING VARIOUS GASEOUS MATERIALS IN A SPECIFIED RATIO

[75] Inventors: Gerhard Wiegleb, Gelselbach; Albert Randow, Bruchkobel, both of Fed. Rep. of Germany

[73] Assignee: Leybold Aktiengesellschaft, Hanau, Fed. Rep. of Germany

[21] Appl. No.: 303,764

[22] PCT Filed: May 13, 1988

[86] PCT No.: PCT/DE88/00282

§ 371 Date: Feb. 7, 1989

§ 102(e) Date: Feb. 7, 1989

[87] PCT Pub. No.: WO88/08743

PCT Pub. Date: Nov. 17, 1988

[30] Foreign Application Priority Data

May 15, 1987 [DE] Fed. Rep. of Germany ....... 3716289

[51] Int. Cl.$^5$ .............................................. G05D 11/13
[52] U.S. Cl. ..................................... 137/565; 137/607;
137/624.2
[58] Field of Search ........... 137/624.2, 101.19, 101.21, 137/93, 607, 565; 251/129.06

[56] References Cited

U.S. PATENT DOCUMENTS

| 3,088,479 | 5/1963 | Christie ............................. 137/93 |
| 3,145,877 | 8/1964 | Scarr, Jr. . | |
| 3,626,963 | 12/1971 | Ziermann . | |
| 3,948,281 | 4/1976 | Strain et al. ........................ 137/93 X |
| 4,062,373 | 12/1977 | Clark et al. ................... 137/624.2 X |
| 4,131,129 | 12/1978 | Firestone ..................... 137/251.1 X |
| 4,142,860 | 3/1979 | Mayeaux ......................... 137/565 X |
| 4,162,689 | 7/1979 | Zdrodowski . | |
| 4,257,439 | 2/1981 | Mayeaux ........................ 137/624.2 X |
| 4,298,181 | 11/1981 | Corrado et al. ................ 251/129.06 |
| 4,345,610 | 8/1982 | Herter et al. ................ 137/624.2 X |
| 4,345,612 | 8/1982 | Koni et al. ..................... 137/101.19 |
| 4,380,242 | 4/1983 | Bresie et al. .................... 137/565 X |
| 4,392,514 | 7/1983 | Farley et al. ..................... 137/624.2 |
| 4,420,009 | 12/1983 | Sharp et al. ..................... 137/599 X |
| 4,498,496 | 2/1985 | Barcellona et al. ............... 137/599 |
| 4,684,104 | 8/1987 | Micard ....................... 251/129.06 X |

FOREIGN PATENT DOCUMENTS

| 0065271 | 11/1982 | European Pat. Off. . |
| 2029138 | 12/1971 | Fed. Rep. of Germany . |
| 2126485 | 1/1972 | Fed. Rep. of Germany . |
| 2835624 | 5/1979 | Fed. Rep. of Germany . |
| 2906300 | 8/1979 | Fed. Rep. of Germany . |
| 2831856 | 2/1980 | Fed. Rep. of Germany . |
| 2840431 | 3/1980 | Fed. Rep. of Germany . |
| 3135455 | 4/1983 | Fed. Rep. of Germany . |
| 7635871 | 6/1977 | France . |
| 2165463A | 4/1986 | United Kingdom . |

Primary Examiner—Stephen M. Hepperle
Attorney, Agent, or Firm—Felfe & Lynch

[57] ABSTRACT

An apparatus for the producton of particular concentrations of gaseous materials as well as for mixing different gaseous materials in a specified ratio in which the gaseous materials are supplied from different sources in pulsed fashion to at least one common outlet. The gaseous materials are passed through a valve which has n inlets and m outlets, n and m being whole numbers. This valve can connect at least one inlet for a specifiable time with a particular outlet. The valves are controlled preferably by a pulse-width modulated method, for example by means of a microprocessor. A gas pump is connected downstream from the common outlet.

14 Claims, 2 Drawing Sheets

APPARATUS FOR THE PRODUCTION OF PARTICULAR CONCENTRATIONS OF GASEOUS MATERIALS AS WELL AS FOR MIXING VARIOUS GASEOUS MATERIALS IN A SPECIFIED RATIO

BACKGROUND OF THE INVENTION

The invention is directed to an apparatus for the production of particular concentrations of gaseous materials as well as for mixing various gaseous materials in a specified ratio.

In many cases it is necessary to produce gaseous mixtures of arbitrary composition and concentration. For example, the equipment used to measure air contamination must be calibrated. This requires special care. Since very small measurement ranges must be calibrated in the case of automatically operating emission stations, for which in most cases cylinders of compressed test gas cannot be produced, dynamic methods of producing test gases are almost always used. To ensure a supply of accurate and reliable test gas mixtures also in these cases, gas mixing equipment is required, with which even calibrations below 1 ppm are possible with great precision.

To control the temperature of water in engine cooling system heat exchangers, it is known to use a magnetic valve controllable by means of a relay (German Patent Publication (DAS) No. 2,840,431). This magnetic valve controls an actuator, which in turn controls a closing member. In this case, the closing member is a cam disk valve, which is movable diagonally between two adjacent arms of a cross-shaped part and opens or closes off several paths.

A similar valve which has two outlets and one inlet is disclosed in the German Patent Publication (DOS) No. 2,126,485. Here also, the valve serves to control the temperature of a liquid.

In a known arrangement for the controlled metering of two or more gases, which are connected over two separate lines with sources for the gases that are to be mixed in a specified ratio, fast acting and electrically controlled on-off valves are clocked in a set time-slot pattern in the separate lines (German Patent Publication (DAS) No. 2,831,856, to which U.S. Pat. No. 4,262,686 corresponds).

In this case, the gases are supplied in pulsed fashion and either the width of the individual gas pulses or the number of pulses per unit time is varied. Nothing is mentioned concerning the generation of pressure, which is necessary for the flow of the gases.

In a different previously known method for mixing gases in a specified ratio, the gases are supplied in pulsed fashion to the mixing space (European Patent No. A1 0 065 271, to which U.S. Pat. No. 4,526,188 corresponds). The ratio of the pulse volumes of the different gases is the same as the desired ratio of the gases in the mixture. Special compressed gas sources provide for the flow of the gas.

Finally, a gas mixing apparatus is also known, in which the proportions of gases supplied over component feeding pipes is adjustable. In this apparatus, the proportion of a gas component is determined by the duration of the gas flow through a throttle valve before and after which the pressure is constant (German Patent Publication (DAS) No. 3,135,455). To improve the accuracy of the measurement, a common throttle valve for the components is disposed in the feeding pipe to a buffer vessel. The throttle valve site can be connected over a controllable multi-way valve with the individual feeding pipes for the components. A pressure regulating valve, which is connected with an receiver line for the gas mixture, is disposed downstream from the buffer vessel. The pressure, necessary for the flow of the gas, is produced by pressure pumps disposed upstream. This is disadvantageous, because the output of a pump depends on the type of gas.

SUMMARY OF THE INVENTION

It is an object of the present invention to provide an apparatus for producing particular gas concentrations, as well as for mixing different gaseous materials in a specified ratio, in which the output fluctuations of a gas pump, which are related to the type of gas, have no effect on the operating accuracy.

This object, as well as other objects which will become apparent from the discussion that follows, are achieved, according to the present invention, by supplying gaseous materials from different sources in pulsed fashion to at least one common outlet and providing a gas pump downstream from the common outlet.

The principal advantage of the present invention is that the pump produces a continuous output and thereby achieves a high calibration accuracy.

For a full understanding of the present invention, reference should now be made to the following detailed description of the preferred embodiments of the invention and to the accompanying drawings.

DESCRIPTION OF THE PREFERRED EMBODIMENTS

Figure 1:
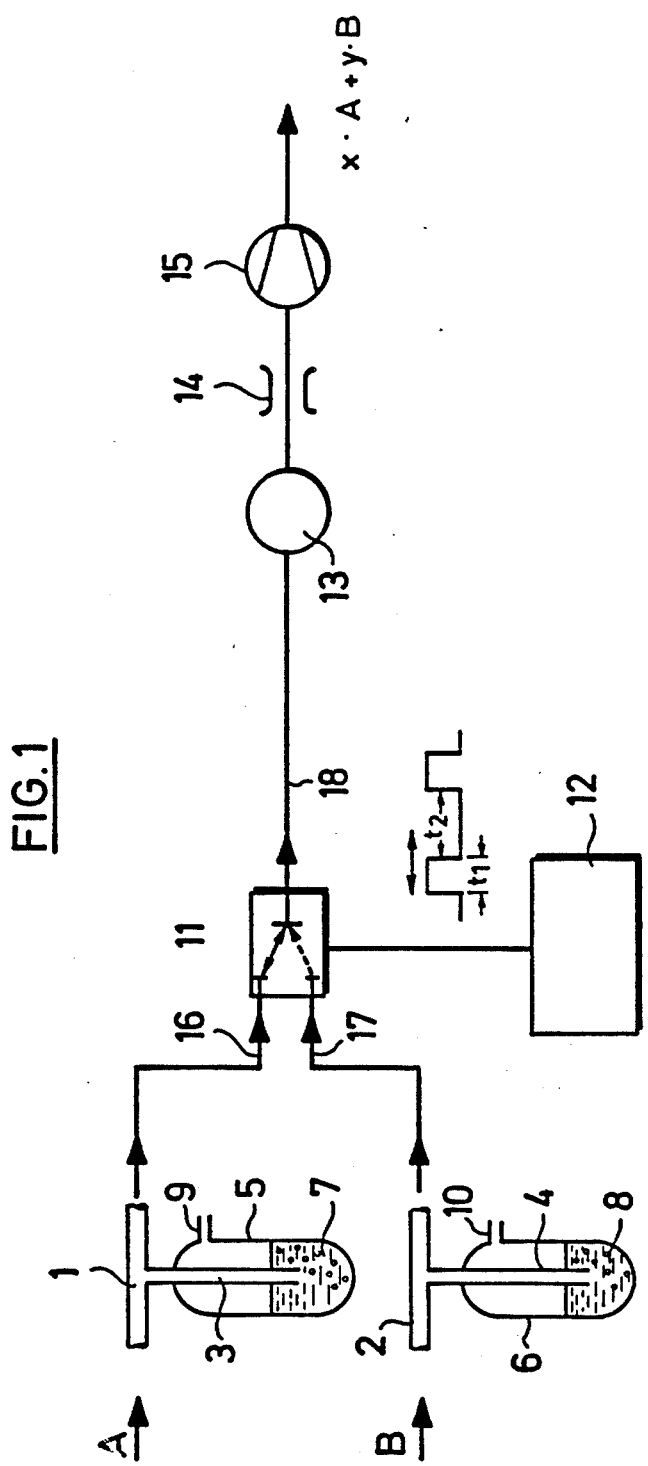
FIG. 1 is a fluid flow diagram according to a first preferred embodiment of the present invention in which discharge vessels are used.

The principle of the present invention will be explained with reference to FIG. 1 which illustrates the mixture of two gas components A and B, each of which is supplied from a tank (not shown) to a pipeline 1 and 2, respectively. These pipelines 1, 2 have branches 3, 4, that extend in each case into a discharge vessel 5, 6, which is filled at least partially with a liquid 7, 8. The ends of the branches 3, 4 are completely immersed in the respective liquid 7, 8. In the upper region of each discharge vessel 5, 6, is a nozzle-shaped opening 9, 10, through which the gases can escape.

After they have passed over the respective discharge vessels 5, 6, gases A and B are supplied to a valve 11 which can also be described as a chopper valve. This valve 11 is preferably a magnetic valve controlled by a microprocessor 12 which is programmed to supply pulse-width modulated pulses to the valve 11. The gas or gas mixture passing out of the valve 11 is supplied to a vessel 13 which serves as buffer. After the gas or gas mixture has passed through vessel 13, it is supplied over a throttle valve 14 to a gas pump 15, the outlet of which is connected to a gas analyzer (not shown).

The apparatus shown in FIG. 1 represents a type of gas modulator which, with the help of the valve 11, switches over between the gas components A and B. The open times for the respective gas components are fixed here by the microprocessor 12, which provides width-modulated pulses to the valve 11. The individual gas streams are then mixed in the vessel 13 and conveyed by the gas pump 15, which may, for example, be a simple membrane pump, into the gas analyzer.

The vessel 13 and the throttle valve 14 must be disposed ahead of the gas pump 15 because the output of the gas pump 15 depends on the type of gas. If the gas pump 15 were to be disposed ahead of the vessel 13 and the throttle valve 14, it would be acted upon by gas that had not yet been mixed and, consequently, the pump output would not be continuous. These output fluctuations are eliminated by disposing the gas pump 15 downstream from the vessel 13 and the throttle valve 14. They can therefore not affect he calibration accuracy.

How a particular gas concentration can be fixed with the help of the apparatus according to the invention will now be described. For this purpose:

$\dot{V}$ is the gas output of the gas pump 15 in liters/minute;

$t_1$ is the time that the valve 11 is open for test gas A;

$t_2$ is the time that the valve 11 is open for test gas B; and c is the gas concentration in percent of test gas A after vessel 13.

The concentration of test gas A is then given by:

$$C(\%) = \frac{\dot{V}t_1}{\dot{V}t_1 + \dot{V}t_2} \times 100\%$$

Since the gas output, $\dot{V}$, occurs in the numerator as well as in all elements of the denominator of the fraction, it cancels out, giving the equation $$C(\%) = \frac{t_1}{t_1 + t_2} \times 100\%$$

It follows from this that the adjusted gas concentration is independent of the output of the pump.

Since the ratio $t_1/t_2$ can be adjusted to almost any value, this is true also for the ratio $t_1/t_2+t_2$ and therefore also for the gas concentration c.

When $t_1$ is very large and $t_2$ is very small, the gas concentration is almost 100%. On the other hand, if $t_2$ is very large in comparison to $t_1$, the concentration tends towards 0%. By specifying particular ratios of $t_1$ and $t_2$ by means of a microprocessor or the like, any adjustment cycle or calibration course can be set. It is merely necessary to plot the respective characteristic curves for this. Automation of the calibration can thus be accomplished in a simple manner.

Magnetic valves, which are used as a chopper valve in the apparatus of FIG. 1, are already known. As described in the brochure of the Firma Bürkert, West Germany, magnetic valves are commercially available as pilot-operated multi-way magnetic valves such as 2 or 3-way valves, externally controlled valves, direct acting valves, etc. It is therefore unnecessary to describe the operation of these valves in greater detail.

Instead of magnetic valves, piezovalves can also be used. The pulse-width modulated pulses are transferred to a piezoelement, which converts these pulses into, for example, a membrane motion. This membrane motion can then be mechanically amplified by means of levers or the like and used to open and close gates or valve elements.

Figure 2:
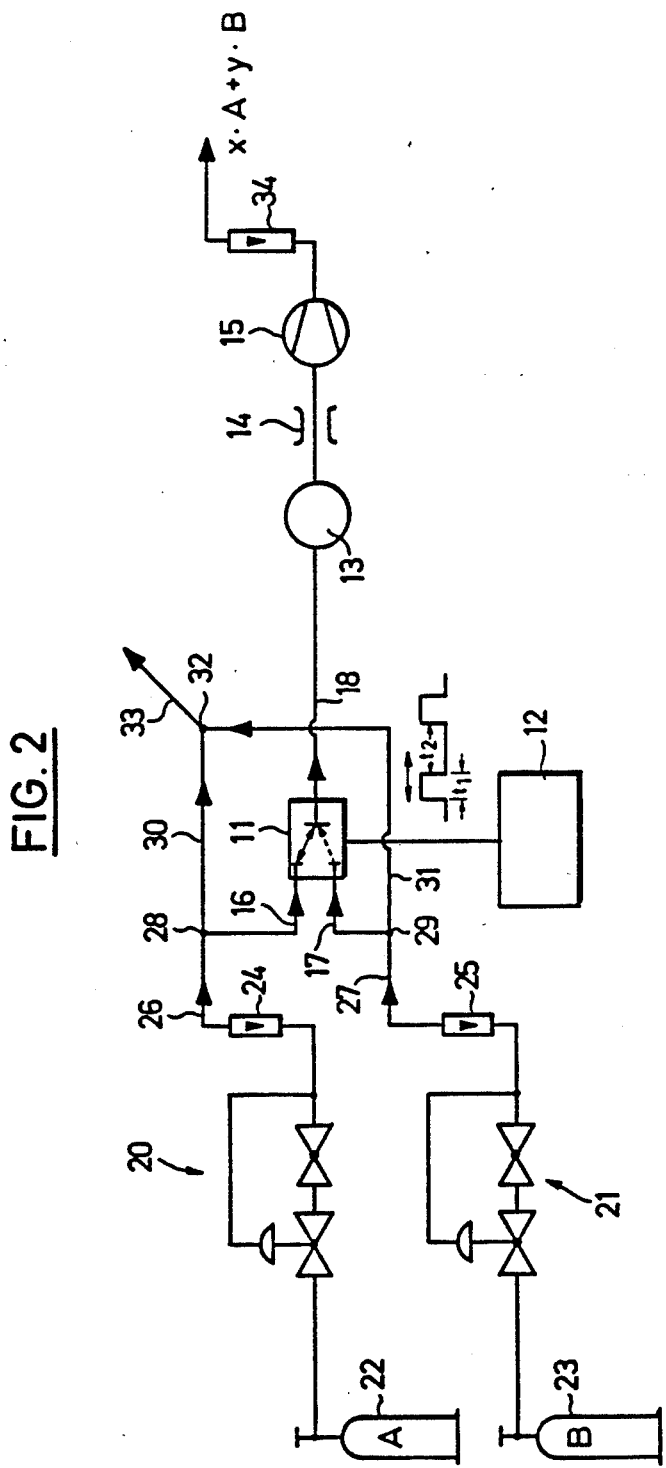
FIG. 2 is a fluid flow diagram according to a second preferred embodiment of the present invention, in which flow controllers are used.

A further embodiment of the invention is shown in FIG. 2. For this embodiment, flow regulators 20, 21 rather than discharge vessels are provided. The test gas A and the blank gas B are supplied to these regulators from gas tanks 22, 23. Flow meters 24, 25, which are based, for example, on the floating element principle, are connected downstream from the flow regulators 20, 21. Each of the outlet lines of these flow meters 24, 25 is connected with a T piece 28, 29, which serves to divide the gas stream. To produce the same pressure relationships for the two gases A, B at the dividing sites, the discharge lines 30, 31 of the T pieces 28, 29 are connected with one another at a point 32, to which an outlet gas pipe 33 is also connected. At this point 32 the pressure is equalized. The legs of the T pieces 28, 29 which are perpendicular to the lines 26, 30 and 27, 31 respectively, lead to the chopper valve 11. In the remaining respects, the arrangement of FIG. 2 corresponds to that of FIG. 1, with the exception that an additional flow meter 34, which passes on a mixture $xA+yB$ of two gases to an analytical instrument, is provided at the outlet of the pump 15.

The use of the invention is not limited to gaseous materials. Rather, the invention can also be used to mix other fluids (e.g. liquid).

There has thus been shown and described a novel apparatus for the production of particular concentrations of gaseous materials as well as for mixing various gaseous materials in a specified ratio which fulfills all of the objects and advantages sought therefor. Many changes, modifications, variations and other uses and applications of the subject invention will, however, become apparent to those skilled in the art after considering this specification and the accompanying drawings which discloses the preferred embodiments thereof. All such changes, modifications, variations and other uses and applications which do not depart from the spirit and scope of the invention are deemed to be covered by the invention which is limited only by the claims which follow.

What is claimed is:

1. Apparatus for mixing a plurality of component gases in a specified ratio, comprising
    a plurality of sources for the respective plurality of gases,
    a multiway valve with "n" inlets and "m" outlets, where n and m are integers and n>m, said inlets being connected to respective sources,
    means for operating said valve in order to supply component gases to at least one of said outlets in pulsed fashion,
    a buffer vessel downstream of said at least one of said outlets, said vessel serving to mix said component gases in the specified ratio, and
    a gas pump downstream of said buffer vessel, said gas pump serving to pump the gases mixed in the specified ratio, said gas pump operating during pulsed supply of said component gases to said buffer vessel, whereby output fluctuations related to the types of component gases being supplied are eliminated and the output of the pump is continuous.

2. The apparatus of claim 1, further comprising a gas throttle valve connected between the gas pump and the vessel for receiving the gases.

3. The apparatus of claim 1, wherein the valve is a magnetic valve.

4. The apparatus of claim 1, wherein the valve is a 2-way magnetic valve.

5. The apparatus of claim 1, wherein the valve is electrically controlled by pulse-width modulated pulses, wherein the pulse-width represents a fixed time interval.

6. The apparatus of claim 1, wherein the gas pump is connected with a gas processing apparatus.

7. The apparatus of claim 6, wherein said processing apparatus is a gas analyzer.

8. The apparatus of claim 1, wherein the gases are supplied in each case through a discharge vessel to a valve.

9. The apparatus of claim 1, wherein the valve is a piezovalve.

10. The apparatus of claim 1, wherein a first gas is supplied to a valve through a first flow regulator and a second gas is supplied to this valve through a second flow regulator.

11. The apparatus of claim 10, wherein a flow meter is connected downstream from each of the first and second flow regulators.

12. The apparatus of claim 11, wherein the outlets of the flow meters are connected to one another.

13. The apparatus of claim 1, wherein $m = n - 1$.

14. The apparatus of claim 1, wherein the gas pump is a suction pump.

* * * * *

UNITED STATES PATENT AND TRADEMARK OFFICE
CERTIFICATE OF CORRECTION

PATENT NO. : 4,938,256
DATED : July 3, 1990
INVENTOR(S) : Wiegleb et al.

It is certified that error appears in the above-identified patent and that said Letters Patent is hereby corrected as shown below:

Column 3, Lines 28 & 29, replace the equation with $$-- C(\%) = \frac{\dot{V}t_1}{\dot{V}t_1 + \dot{V}t_2} \times 100\% --$$

Signed and Sealed this

First Day of September, 1992

*Attest:*

DOUGLAS B. COMER

*Attesting Officer*     *Acting Commissioner of Patents and Trademarks*